No. 622,405. Patented Apr. 4, 1899.
S. M. VAN ALLEN.
AUTOMATIC PUMP FOR VEHICLES.
(Application filed Sept. 24, 1897.)
(No Model.) 2 Sheets—Sheet 1.
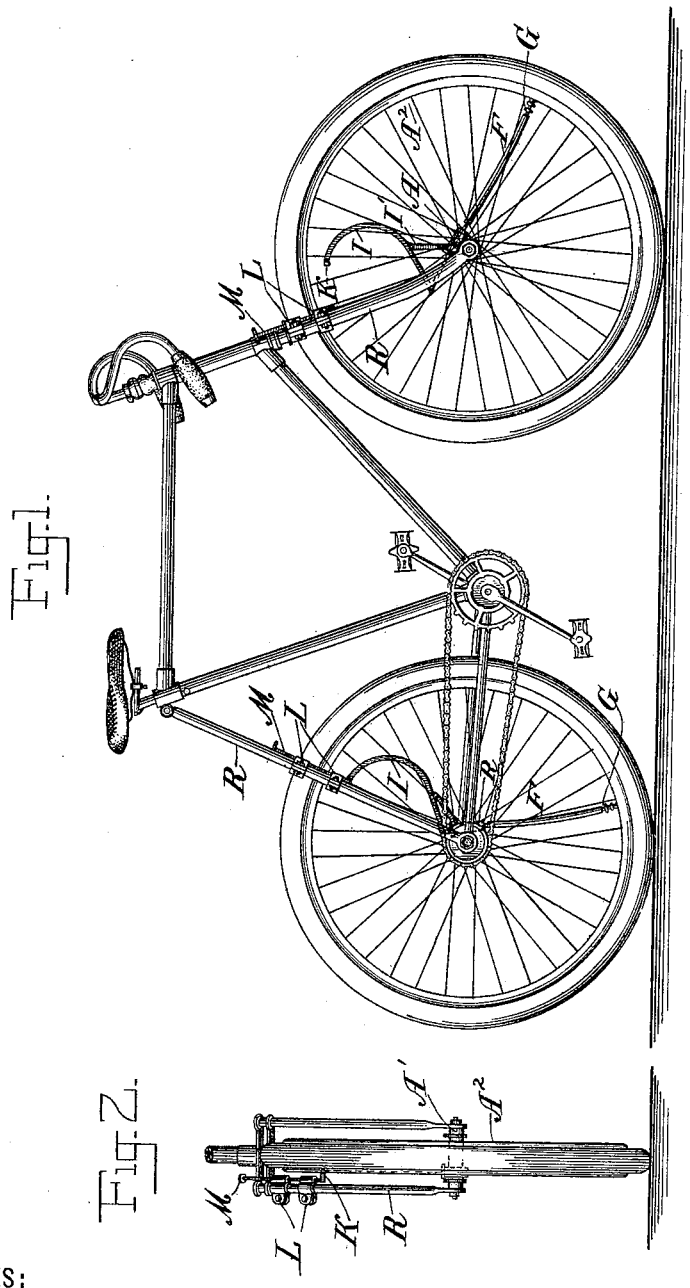

No. 622,405. Patented Apr. 4, 1899.
S. M. VAN ALLEN.
AUTOMATIC PUMP FOR VEHICLES.
(Application filed Sept. 24, 1897.)
(No Model.) 2 Sheets—Sheet 2.
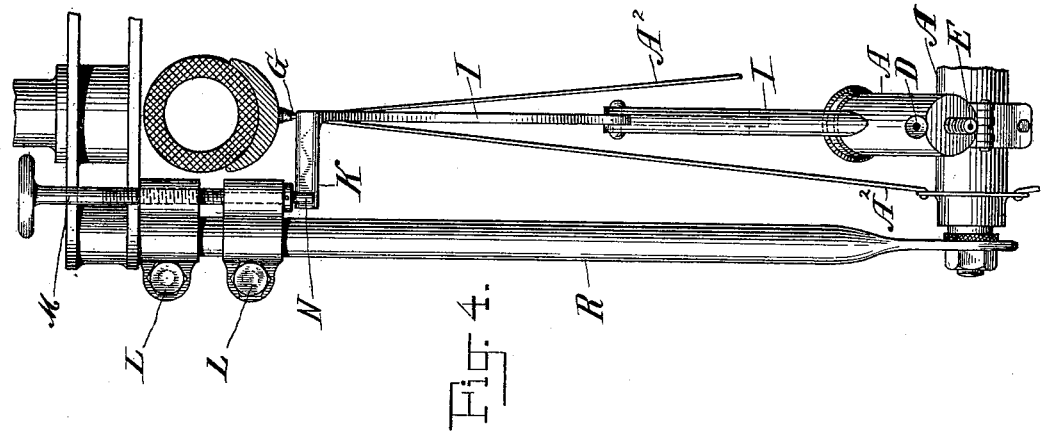
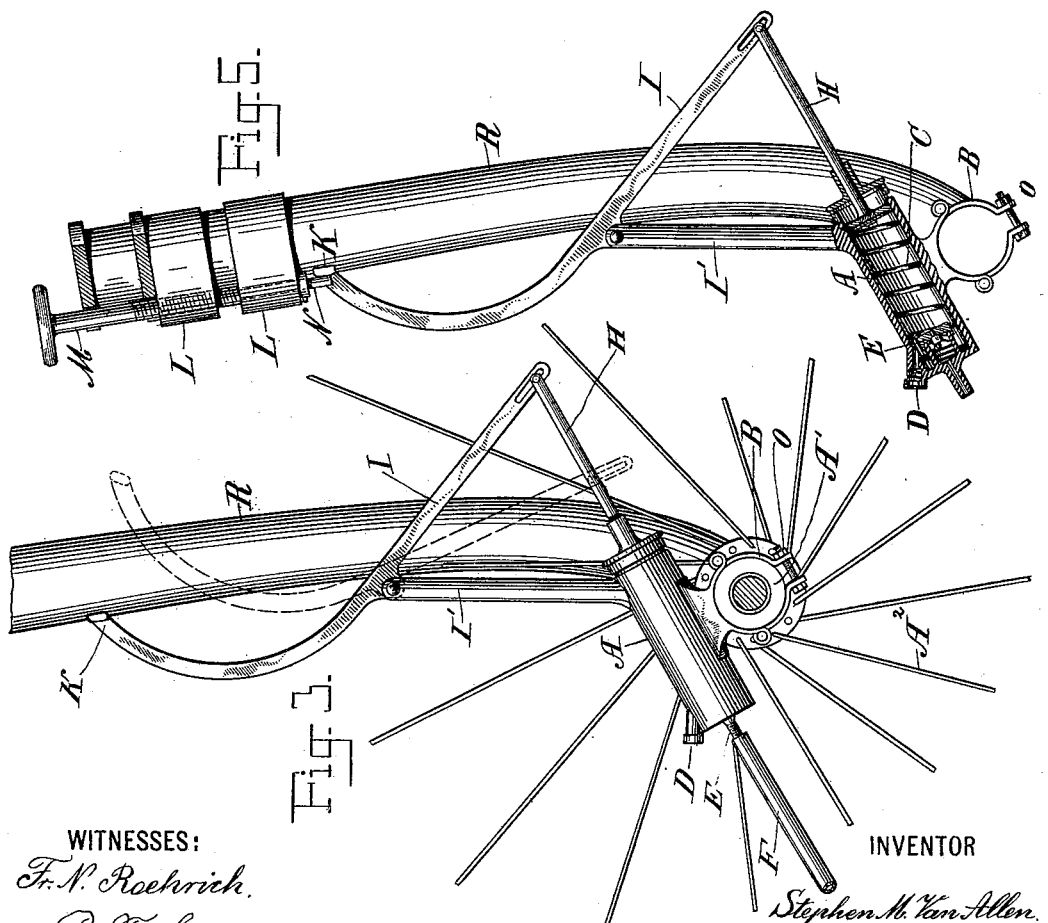
WITNESSES:
Fr. N. Roehrich.
R. F. Sweeny.
INVENTOR
Stephen M. Van Allen.
BY
James C. Van Siclen,
ATTORNEY

UNITED STATES PATENT OFFICE.

STEPHEN M. VAN ALLEN, OF NEW YORK, N. Y.

AUTOMATIC PUMP FOR VEHICLES.

SPECIFICATION forming part of Letters Patent No. 622,405, dated April 4, 1899.

Application filed September 24, 1897. Serial No. 652,861. (No model.)

*To all whom it may concern:*

Be it known that I, STEPHEN M. VAN ALLEN, a citizen of the United States, residing at New York, (Jamaica,) in the county of Queens and State of New York, have invented a new and useful Automatic Pump for Vehicles, of which the following is a specification.

My invention, while relating generally to automatically-operated pumps for bicycles and other equivalent forms of vehicle employing pneumatic tires, has reference more particularly to that form thereof which are applied to the hubs of these vehicles and are operated by the piston-rod or other actuating parts connected therewith being brought into contact with some stationary abutment or part, its object being to provide a pump of this class as a separate and complete attachment in itself which shall be capable of application to any of the ordinary forms of bicycles and vehicles using pneumatic tires and of detachment therefrom, as may be desired, without necessitating any change in or modification of the bicycle or vehicle to which it may be applied or any additional permanent parts for coöperation therewith.

To this end the invention consists in the peculiarities of construction of the pump and its attachments, all as will hereinafter more fully appear.

Referring to the accompanying drawings, which form a part of this specification, Figure 1 is a side elevation of a bicycle to both wheels of which my invention is applied; Fig. 2, a front elevation of the front wheel of a bicycle with my invention attached, the handle-bars and part of the head being removed; Fig. 3, a sectional detailed view showing in side elevation one of the front forks and a portion of the wheel with my invention applied thereto; Fig. 4, a transverse sectional elevation taken through the front wheel of a bicycle, showing portions of the front wheel, the pump applied thereto, and the projection by which the pump is operated; and Fig. 5, a detailed side elevation of one of the front forks, the pump-operating projection, the cylinder of the pump being shown in the section.

Similar letters refer to similar parts throughout the several views or drawings.

A indicates an ordinary piston or other pump which is or may be attached to the hub A' of the wheel A² circumferentially by a clamp or clasp B of the requisite size, according to the circumference of the hub, holding the pump rigidly and stationarily, said clamp being secured to the hub by means of a bolt or screw O. Within the cylinder of the pump A is a spiral spring C, and such pump is provided with two valves, one of which, D, permits of air entering the pump A, and the other, E, of the passing of the air therefrom into the conducting pipe or tube F, connecting with the valve of the tire at G. At the other end of the pump A, opposite to E, enters the piston or plunger H, attached to the end of which is the end of a lever I, which is fulcrumed upon an arm I', extending outward from the pump A, and provided at its free end with an outturned or otherwise-constructed portion K.

To either fork or reach R of the vehicle, and preferably on the inner side thereof, is applied or attached by clamps L L the abutment or screw M, which, passing through the clamps L L and being adjusted by turning it in one or the other direction, extends downward and below the clamps L L, when in operation, sufficiently far to directly meet the free end K of the lever I at each revolution of the wheel, as shown at N. When the wheel is revolved and the free end of the lever K meets the lower end of the abutment or screw M, the lever I drives backward and into the pump A the piston or plunger H, and the air taken in the pump A by the valve D is forced out of the pump A through the valve E and the connecting pipe or tube F into the tire through its valve G, the return of the piston to its original or normal position after the lever has passed the abutment being effected by the spring C.

The pump A may be put into or thrown out of operation by moving the abutment or screw M forward or backward and while the vehicle is in motion and may be applied to either or both or any of the wheels of a bicycle or other vehicle, as desired.

The tube F may be of rubber, metal, or other material, and the plunger H may be solid or hollow, and the lever I may be made in the form of a gooseneck or angular, as preferred.

The parts being thus constructed and provided with attaching clips or clamps may be attached to and detached from any of the ordinary bicycles and equivalent vehicles, as desired, without requiring any alterations therein or any permanent parts connected therewith.

Although in the foregoing I have described the best means contemplated by me for carrying my invention into practice, I wish it distinctly understood that I do not limit myself thereto, but reserve to myself the right to modify the same in various ways without departing from the spirit thereof.

Having thus described my invention and specified certain of the ways in which it is or may be carried into effect, I claim and desire to secure by Letters Patent of the United States—

1. An attachment for automatically inflating a vehicle-tire, comprising a pump having a clamp for attachment to the hub of a vehicle-wheel, a lever for operating the piston of said pump, a clamp adapted to be removably connected with a part of the frame of the vehicle and having an adjustable abutment adapted to be engaged by said lever as the latter rotates with the wheel, and means within the reach of a rider on the vehicle for adjusting said abutment into and out of the path of movement of the lever while the vehicle is in use.

2. The combination, with a pump-cylinder having an arm extending therefrom and provided with a clamp whereby it is adapted for attachment to the hub of a wheel, a piston arranged in said cylinder, and appropriate inlet and outlet valves, of a lever pivoted to said arm and connected at one of its ends with the piston, an abutment against which the other or free end of the said lever engages, clamps adapted for engagement with the forks of a bicycle or other convenient part of a vehicle for securing the abutment thereto, and a tube for connecting the pump with the tire, substantially as described, all of said parts being adapted to be attached to or entirely removed from a vehicle without special construction of, or work on, the vehicle itself.

In witness whereof I have hereunto set my hand this 23d day of September, 1897.

STEPHEN M. VAN ALLEN.

Witnesses:
JAMES C. VAN SICLEN,
W. A. WARNOCK.